June 9, 1942.  L. F. HEMPHILL  2,285,970
BRUSH HOLDING DEVICE
Filed Oct. 18, 1941
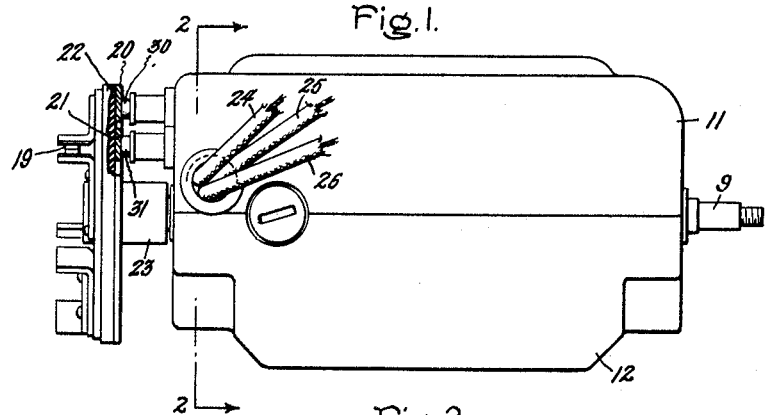
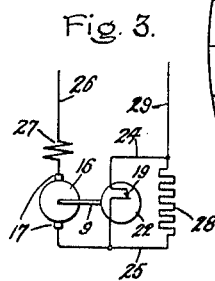
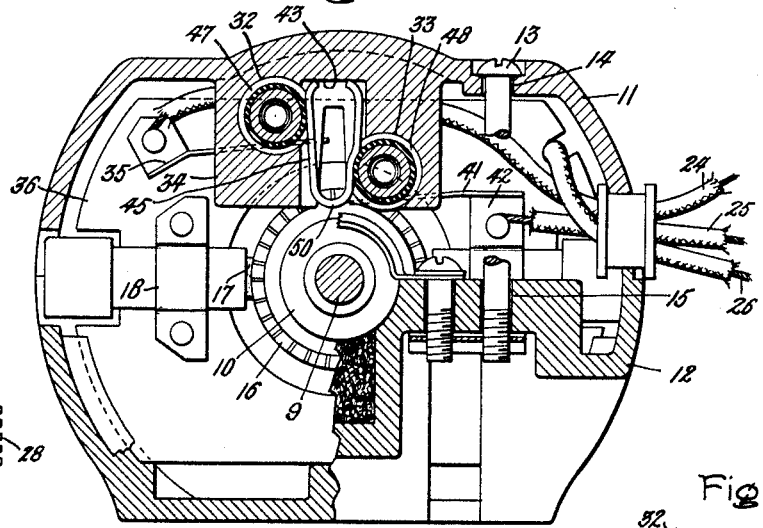
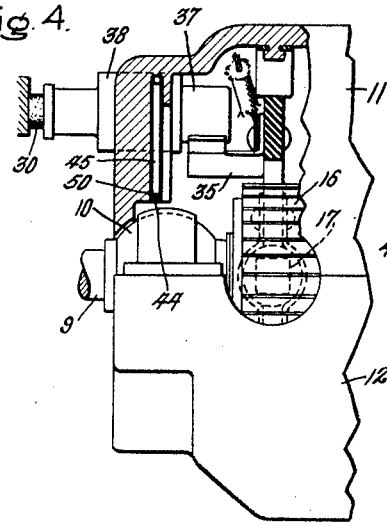
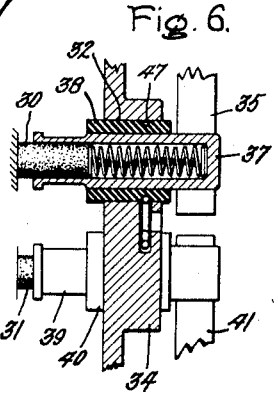
Inventor:
Lawrence F. Hemphill,
by Harry E. Dunham
His Attorney.

Patented June 9, 1942

2,285,970

UNITED STATES PATENT OFFICE 2,285,970

BRUSH HOLDING DEVICE

Lawrence F. Hemphill, Fort Wayne, Ind., assignor to General Electric Company, a corporation of New York Application October 18, 1941, Serial No. 415,570

4 Claims. (Cl. 171—324)

My invention relates to brush holding devices and in particular to an arrangement for supporting brush holders in the frame of a dynamo-electric machine.

An object of my invention is to provide an improved brush holding device.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a side elevational view of a dynamo-electric machine embodying my improved brush holding device; Fig. 2 is an enlarged sectional view taken along line 2—2 of Fig. 1; Fig. 3 is a schematic diagram of the electrical connections of the motor shown in the other figures; Fig. 4 is an enlarged view of a part of the machine shown in Fig. 1, partially broken away to illustrate more clearly my improved brush holding device; Fig. 5 is a plan view of the U-shaped spring clip which forms part of my improved brush holding device; and Fig. 6 is an enlarged sectional plan view of a part of the machine shown in Figs. 1 and 2, illustrating the relative arrangement of the retaining spring clip, the supporting frame, and the brush holder.

Referring to the drawing, I have shown a motor provided with a rotatable member mounted on the shaft 9 supported in bearings 10 arranged in each end of the stationary member frame. This stationary member frame is formed as a split unit and includes two complementary sections 11 and 12 which are secured together by bolts 13 extending through openings 14 in the upper frame section 11 and through openings 15 in the lower frame section 12. The rotatable member of this machine is provided with a commutator 16 to which electric current is supplied by commutator brushes 17 secured in the machine by brush holder clamps 18. This dynamo-electric machine is a motor of the type used to drive small apparatus, such as business machines, and is provided with a speed limiting or governing switch 19 adapted to be connected as a short-circuiting switch in parallel with a resistance in the motor circuit to control the speed of the machine. The current is adapted to be led to and from the governing switch 19 through a pair of slip rings 20 and 21 mounted on an insulating supporting plate 22. This switch assembly is mounted on a hub 23 supported on an extension of the shaft 9 of the rotatable member of the machine. Power is adapted to be supplied to the motor through leads 24, 25, and 26. As is more clearly shown in Fig. 3, the lead 26 is connected to a terminal of the field exciting winding 27 and the other terminal of the field exciting winding 27 is connected to one of the brushes 17. The other brush 17 is connected to the lead 25 and to one contact of the governor switch 19, while the other contact of the governor switch 19 is connected to the lead 24. The leads 24 and 25 are connected across an external resistance 28 and a lead 29 connects the common terminal of the resistance 28 and the lead 24 to the source of electrical power supply. In this manner, when the motor operates at a speed below a predetermined maximum speed, the contacts of the governor switch 19 remains closed, and the armature and field exciting windings of the motor are connected in series directly across the source of electrical power supply. If the motor tends to exceed this predetermined maximum speed, the contacts of the switch 19 open and insert the resistance 28 in series with the motor circuit, thereby decreasing the speed of the motor.

Current is led to and from the governor switch 19 through the slip rings 20 and 21 by contact brushes 30 and 31 which are supported in brush holders mounted in the motor frame in passages 32 and 33 formed in a boss 34 in the frame section 11. The current is led to these brushes from the source of electrical power supply through the lead 24 connected to a contact finger 35, which is mounted on an insulating supporting frame 36 and is arranged to make electrical contact with the inner end of a brush holder sleeve 37 formed of electrically conductive material. This sleeve 37 is mounted in a bushing 38 formed of insulating material and is adapted to support the contact brush 30. The contact brush 31 also is supported in a brush holder sleeve 39 of conductive material arranged within an insulating bushing 40, which extends through the passage 33 in the frame boss 34. This sleeve 39 is connected to the lead 25 by a spring finger 41 which is secured to a commutator brush holder mounting clip 42. In order to insure against displacement of the brush holders within the longitudinally extending openings 32 and 33 in the frame boss 34, a transversely extending slot 43 is formed in the boss 34 and is of a width such as to provide communication with the passages 32 and 33. This slot is formed with an open end 44 at the inner portion thereof and a U-shaped spring clip 45 is slidably fitted into the slot 43. The sides 46 of this spring clip are arranged in engagement with circular grooves 47 and 48 formed in the outer surface of the insulating bushings 38 and 39, respectively, and provide a latching arrangement which prevents longitudinal movement of the brush holders. The side 46 of the spring clip 45 which engages the inner bushing 39 is formed with an angularly offset portion 49 which is curved on a radius substantially the same as that of the groove 48, and the closed end 50 of the clip is arranged adjacent the open end 44 of the slot 43 to facilitate removal of the spring clip from the slot. With such an arrangement, the passages 32 and 33 securely hold the brush holders in position radially of the supporting frame member 11 and the resilient spring clip 45 retains the pair of brush holders in the desired relative longitudinal positions in the pair of passages formed in the supporting frame member. This provides a very easily assembled and disassembled contact brush holding device which does not require any adjustment and minimizes the tendency of the brush holder to become loosened in its supporting member while in use.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A contact brush holding device including a supporting member, a pair of passages through said supporting member, a transversely extending slot in said supporing member communicating with said passages, a brush holder bushing in each of said passages provided with a groove arranged in registry with said supporting member slot, and means including a substantially U-shaped clip arranged in said slot in engagement with said bushing grooves for retaining said brush holder bushings in position in said passages.

2. A contact brush holding device including a supporting member, a pair of passages through said supporting member, a transversely extending slot in said supporting member communicating with said passages, an insulating bushing in each of said passages provided with a circular groove in the outer surface thereof arranged in registry with said supporting member slot, and means including a substantially U-shaped clip arranged in said slot with the sides thereof in engagement with said bushing grooves for retaining said bushings in position in said passages.

3. A contact brush holding device including a supporting member, a passage through said supporting member, a transversely extending slot in said supporting member communicating with said passage, a bushing in said passage provided with a groove in the outer surface thereof arranged in registry with said supporting member slot, and means including a substantially U-shaped spring clip slidably arranged in said slot with a side thereof in engagement with said bushing groove for retaining said bushing in position in said passage and with the closed end of said clip arranged adjacent the open end of said slot for facilitating removal of said clip from said slot.

4. A contact brush holding device including a supporting member, a pair of passages through said supporting member, a transversely extending slot in said supporting member communicating with said passages, an insulating bushing in each of said passages provided with a circular groove in the outer surface thereof arranged in registry with said supporting member slot, a sleeve of conductive material in each of said bushings, a contact brush in each of said sleeves, and means including a substantially U-shaped clip arranged in said slot with the sides thereof in engagement with said bushing grooves for retaining said bushings in position in said passages.

LAWRENCE F. HEMPHILL.